United States Patent
Huang et al.

(10) Patent No.: US 11,176,112 B1
(45) Date of Patent: Nov. 16, 2021

(54) APPARATUS OF ADAPTIVE INDEX FOR MULTIPLE ATTRIBUTES

(71) Applicant: National Central University, Taoyuan (TW)

(72) Inventors: Chih-Yuan Huang, Taoyuan (TW); Yu-Jui Chang, Taoyuan (TW)

(73) Assignee: National Central University, Taoyuan (TW)

(*) Notice: Subject to any disclaimer, the term of this patent is extended or adjusted under 35 U.S.C. 154(b) by 0 days.

(21) Appl. No.: 17/084,847

(22) Filed: Oct. 30, 2020

(30) Foreign Application Priority Data

Oct. 14, 2020 (TW) .................................. 109135558

(51) Int. Cl.
| | |
|---|---|
| *G06F 16/22* | (2019.01) |
| *G06F 16/28* | (2019.01) |
| *G06F 16/248* | (2019.01) |
| *G06F 16/21* | (2019.01) |
| *G06F 16/2453* | (2019.01) |
| *G06F 11/34* | (2006.01) |

(52) U.S. Cl.
CPC ...... *G06F 16/2246* (2019.01); *G06F 11/3409* (2013.01); *G06F 16/217* (2019.01); *G06F 16/248* (2019.01); *G06F 16/24545* (2019.01); *G06F 16/288* (2019.01)

(58) Field of Classification Search
CPC ............... G06F 16/2246; G06F 16/217; G06F 16/24545; G06F 16/288; G06F 16/248; G06F 11/3409
See application file for complete search history.

(56) References Cited

U.S. PATENT DOCUMENTS

| | | | |
|---|---|---|---|
| 10,127,251 B2* | 11/2018 | Deshpande | ........... G06F 16/219 |
| 2014/0099938 A1* | 4/2014 | Calo | .................... G06F 16/2246 |
| | | | 455/422.1 |

(Continued)

OTHER PUBLICATIONS

Ding, Zhiming, et al. "A hybrid search engine framework for the internet of things based on spatial-temporal, value-based, and keyword-based conditions." 2012 IEEE International Conference on Green Computing and Communications. IEEE, 2012. (Year: 2012).*

(Continued)

*Primary Examiner* — Mohsen Almani
(74) *Attorney, Agent, or Firm* — Demian K. Jackson; Jackson IPG PLLC (57) ABSTRACT

An apparatus of adaptive index structures is provided. Four common data attributes, including time, space, keyword, and value, are used. The present invention is a structure adaptively selecting the most efficient combined index by estimating index performance and selectivity rate. The main concept is to set indexes with high selectivity rates at positions having higher priorities for processing query. The intermediate result of query is minimized and the performance is further improved. The present invention uses multiple indexes, where all possible combined-index orders are considered and the best combined index is selected according to different query adaptabilities. As a result, the structure has a high chance of saving query time at a rate of more than 25 times as compared to a structure with indexes of a single attribute sequence. Furthermore, as compared to the traditional relational database PostGIS, the reaction time is also twice faster.

7 Claims, 9 Drawing Sheets

(56) References Cited

U.S. PATENT DOCUMENTS

2014/0279838 A1* 9/2014 Tsirogiannis ........... G06F 16/22
707/603
2016/0070754 A1* 3/2016 Mokbel .................. G06F 16/31
707/718

OTHER PUBLICATIONS

Li, Xianhui, Cuihua Ren, and Menglong Yue. "A distributed real-time database index algorithm based on B+ tree and consistent hashing." Procedia Engineering 24 (2011): 171-176. (Year: 2011).*
Ke, Shengnan, et al. "A hybrid spatio-temporal data indexing method for trajectory databases." Sensors 14.7 (2014): 12990-13005. (Year: 2014).*
Abd Elwahab, Marwa AM, et al. Combining R-Tree and B-Tree to enhance Spatial queries processing. Diss. Master Thesis, Arab Academy for Science and Technology and Maritime Transport, College of Computing, Egypt, 2013. (Year: 2013).*
Papadias, Dimitris, et al. "Indexing spatio-temporal data warehouses." Proceedings 18th International Conference on Data Engineering. IEEE, 2002. (Year: 2002).*
Ding, Zhiming, Jiajie Xu, and Qi Yang. "SeaCloudDM: a database cluster framework for managing and querying massive heterogeneous sensor sampling data." The Journal of Supercomputing 66.3 (2013): 1260-1284. (Year: 2013).*

* cited by examiner

|  | 1st | 2nd | 3rd | 4th | 5th | 6th |
|---|---|---|---|---|---|---|
| percentage (%) | 45.3 | 24.6 | 14.1 | 9.7 | 3.3 | 3.0 |
| response time (ms) | 3.6 | 3.9 | 5.7 | 7.0 | 172.4 | 181.9 |

FIG.4

|  | KSTV | KSVT | KTSV | KTVS | KVST | KVTS |
|---|---|---|---|---|---|---|
| $1^{st}$(%) | 7.1 | 5.1 | 1.6 | 15.0 | 2.2 | 14.3 |
| $2^{nd}$(%) | 4.9 | 5.8 | 0.2 | 5.1 | 0.9 | 7.1 |
| $3^{rd}$(%) | 1.8 | 2.2 | 1.3 | 2.5 | 3.4 | 2.9 |
| $4^{th}$(%) | 1.8 | 2.1 | 0.4 | 1.2 | 0.6 | 3.5 |
| $5^{th}$(%) | 0.9 | 1.2 | 0 | 0.2 | 0.5 | 0.5 |
| $6^{th}$(%) | 0.4 | 0.3 | 0.1 | 0.1 | 0 | 1.1 |

FIG.5

|  | 1st | 2nd | 3rd | 4th | 5th | 6th |
|---|---|---|---|---|---|---|
| percentage (%) | 47.7 | 28.3 | 19.5 | 4.4 | 0 | 0.1 |
| response time (ms) | 3.2 | 4.1 | 6.2 | 9.6 | 153.6 | 188.6 |

FIG.6

|  | KSTV | KSVT | KTSV | KTVS | KVST | KVTS |
|---|---|---|---|---|---|---|
| $1^{st}$(%) | 0 | 0 | 0.8 | 10.5 | 0 | 36.4 |
| $2^{nd}$(%) | 0 | 0 | 1.5 | 9.2 | 0 | 18.6 |
| $3^{rd}$(%) | 0 | 0 | 1.0 | 7.3 | 0 | 11.2 |
| $4^{th}$(%) | 0 | 0 | 3.9 | 0.1 | 0 | 0.4 |
| $5^{th}$(%) | 0 | 0 | 0 | 0 | 0 | 0 |
| $6^{th}$(%) | 0 | 0 | 0 | 0 | 0 | 0.1 |

FIG.7

|  | the present invention | | | | PostGIS |
|---|---|---|---|---|---|
|  | master node | selecter | actual query | data filtering | |
| response time (ms) | 0.02 | 16.3 | 0.34 | 0.12 | 17.45 |

FIG.8

|  | the present invention |  |  |  | PostGIS |
|---|---|---|---|---|---|
|  | master node | selecter | actual query | data filtering |  |
| response time (ms) | 0.15 | 33.43 | 6.66 | 2.23 | 84.64 |

FIG.9

APPARATUS OF ADAPTIVE INDEX FOR MULTIPLE ATTRIBUTES

TECHNICAL FIELD OF THE INVENTION

The present invention relates to data query with indexes for multiple attributes; more particularly, to a structure adaptively selecting a most efficient combined index, where index performance and filtering rate are estimated for individual indexes.

DESCRIPTION OF THE RELATED ARTS

In recent years, as the Internet of Things (IoT) has good automatic monitoring features, its applications are gradually and widely used in various fields. However, with more and more IoT devices, the huge amount of IoT data is facing the issue of how to improve scalability. Hence, many studies notes that the key-value storage is a more suitable choice for managing huge amount of data than traditional relational database. Nevertheless, the IoT data has the feature of multiple attributes, like time, space, theme, etc. With the rapid growth of data, serious data management problems occur, which makes how to construct an efficient multi-attribute index structure becomes an important issue.

The traditional multi-attribute indexing method is to construct an independent index. The query results are integrated after being processed independently. Yet, independent index is not most optimized for query. In this regard, there are many studies that propose different combined indexes to solve the problem of multi-attribute data management, while the order of indexes is a key factor in determining query performance. However, many existing studies only adopt a fixed index integration sequence to design their combined indexes, which means more time required for query. Hence, the prior arts do not fulfill all users' requests on actual use.

SUMMARY OF THE INVENTION

The main purpose of the present invention is to build a structure that adaptively selects a most efficient combined index, where index performance and filtering rate are estimated for individual indexes; the main concept is to set indexes with high filtering rates at positions having higher priorities for processing queries; and, thus, the intermediate result of query is minimized and the performance of data query is further improved.

To achieve the above purposes, the present invention is an apparatus of adaptive index structures with multiple attributes, comprising a master-node device and a plurality of index structures, where the master-node device balances a plurality of loads of different index structures after accumulating a certain amount of data; the master-node device applies a $B^+$-tree to index a plurality of time periods being managed by each of the index structures; the master-node device has leaf nodes connecting to the index structures; the index structures integrate various orders of indexes to obtain a plurality of combined indexes; each of the index structures comprises a selector and a data filter; the selector selects a most suitable one of the combined indexes according to a query condition; each of the combined indexes has four data attributes, including keyword attribute, value attribute, temporal attribute, and spatial attribute; the data attributes has different orders thereof to form the combined indexes; and each of the combined indexes has a single tree structure integrating indexes of different layers; the leaf node of a superior-layer index is the root node of inferior-layer indexes; the indexes at different layers have different node sizes and the node size of top-layer index is greater than the node size of bottom-layer index; on receiving a query from a user, the temporal attribute is applied at first to select a corresponding one of the index structures and the query is transmitted to each of the index structures; the selector of each of the index structures selects the most effective one of the combined indexes to process the query; after finishing the query, a candidates result is obtained to be transmitted to the data filter to filter out unwanted data; and, at last, an item of original data is searched out from a key-value storage to be responded back to the user. Accordingly, a novel apparatus of adaptive index structures with multiple attributes is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1~FIG. 9, which are a structural view showing a preferred embodiment according to the present invention; a structural view showing KVTS combined indexes; a view showing relationship between sizes, accuracy, and performance of nodes selected by selectors; a view showing accuracy of a selector with simulation data; a view showing sharing of the accuracy of the selector with the simulation data; a view showing the accuracy of the selector with actual data; a view showing the sharing of the accuracy of the selector with the actual data; a view showing index performance with simulation data; and a view showing the index performance with actual data. As shown in the figures, for solving the problem of only adopting a fixed index integration sequence to design combined indexes, the present invention considers all possible index orders and selects the best combined index according to different query adaptabilities. In each of the combined indexes, four different attributes, including spatial attribute, temporal attribute, value attribute, and keyword attribute, are suitable for different index managements. Besides, for achieving better scalability, a key-value storage is applied to manage original data.

Figure 1:
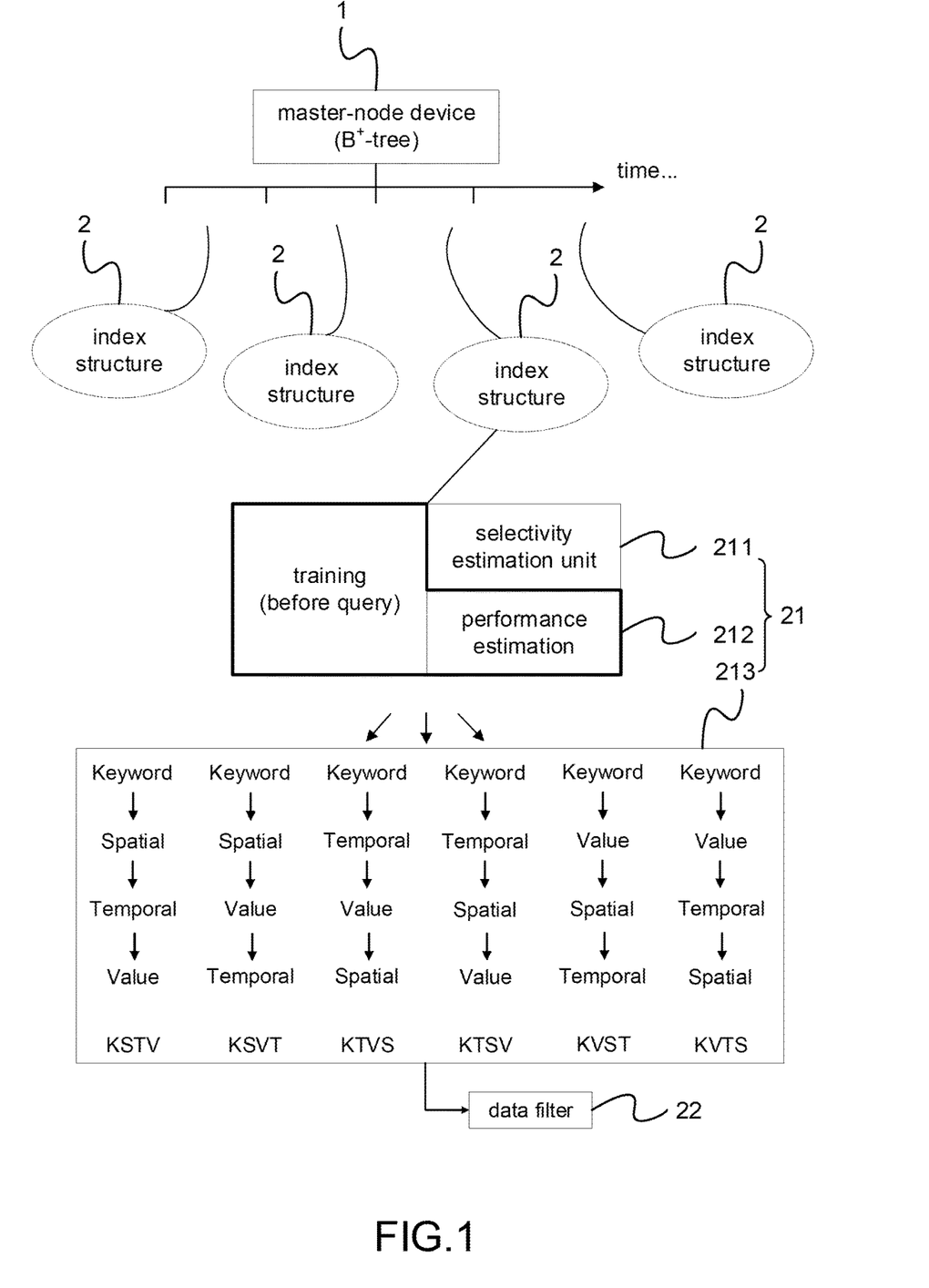
FIG. 1 is the structural view showing the preferred embodiment according to the present invention.
Figure 2:
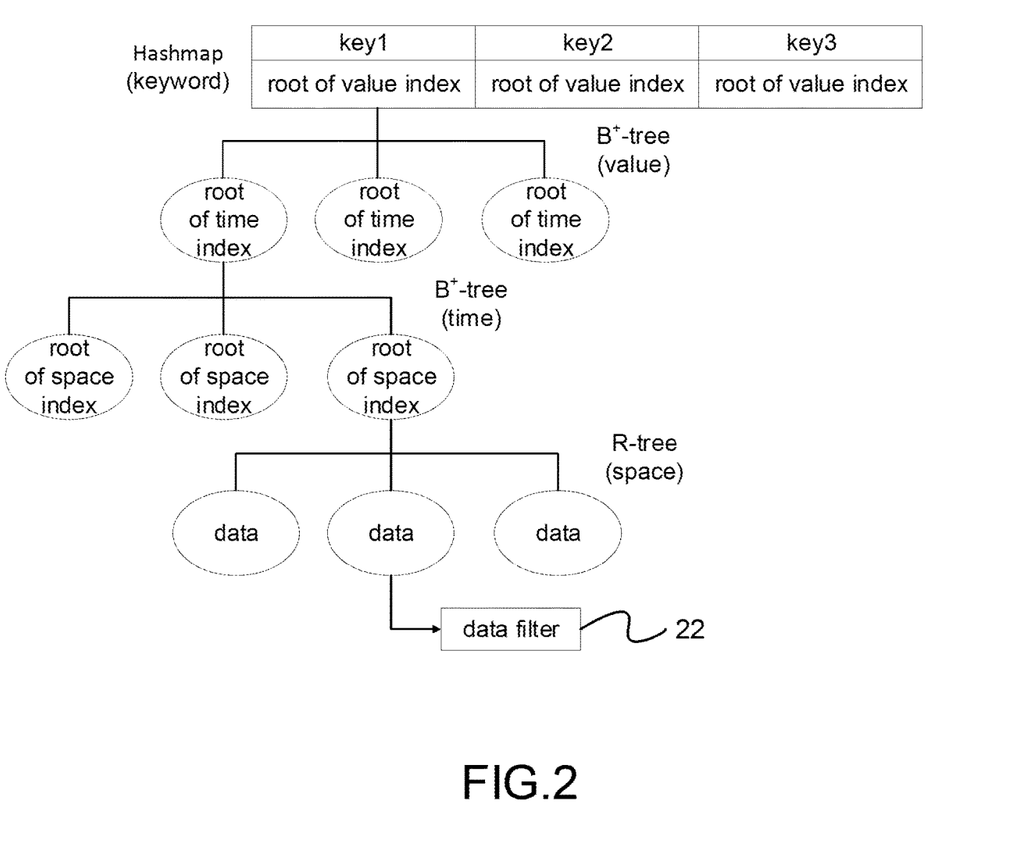
FIG. 2 is the structural view showing the KVTS combined indexes.

The present invention is an apparatus of adaptive index structures with multiple attributes. A master-node device 1 is obtained at first to balance a plurality of loads of different index structures 2 after accumulating a certain amount of data. The master-node device 1 applies a Bk-tree to index a plurality of time periods being managed by each of the index structures 2, where the master-node device 1 has leaf nodes connecting to the index structures 2. Each of the index structures 2 integrates various index orders to obtain the combined indexes, where each of the index structures 2 comprises a selector 21 and a data filter 22. The selector 21 selects a most suitable one of the combined indexes according to a query condition, and uses the index order to name each one of the combined indexes. A KVTS combined index is shown in FIG. 2, where the combined indexes are obtained by combining indexes of keyword attribute, value attribute, temporal attribute, and spatial attribute. Because each of the combined index is a single tree structure, the leaf node of a superior-layer index is the root node of inferior-layer indexes.

When the index structures 2 receive a query from a user, a temporal attribute is applied at first to select a corresponding one of the index structures 2 and the query is transmitted to each of the index structures 2. The selector 21 in each of the index structures 2 selects a most effective one of the combined indexes to process the query. After finishing the query, a candidate result is obtained to be transmitted to the data filter 22 to filter unwanted data. At last, an item of original data is searched out from a key-value storage (not shown in the figures) to be responded back to the user. Thus, a novel apparatus of adaptive index structures with multiple attributes is obtained.

The present invention considers three indexes for the four most common attributes. In particular, the keyword attribute uses Hashmap; the spatial attribute uses R-tree; the temporal attribute uses $B^+$-tree; and the value attribute uses another $B^+$-tree. Traditionally, indexes are constructed independently, and the query has results integrated after being processed independently. The combined indexes proposed by the present invention integrate indexes of different layers, where the leaf node of a superior-layer index is the root node of inferior-layer indexes. Under this circumstance, the processing of the query of the combined indexes benefits from minimizing intermediate results of the query with query performance further improved.

In the index structures 2, the present invention considers all possible index orders of the combined indexes. Each of the combined indexes comprises an R-tree applied to the spatial attribute, two $B^+$-tree applied to the temporal attribute and the value attribute, and a Hashmap applied to the keyword attribute. Besides, the Hashmap is always used to form a first-layer index, where, as compared with the other indexing methods in the present invention, its performance does not change much as data size increases. Hence, through setting the Hashmap to form the first-layer index, the data amount managed by the next level of index is reduced and the query performance is significantly further improved.

The present invention divides the process of the query in each of the index structures 2 into four steps, including selectivity estimation, performance estimation, index query, and data filtering. On receiving the query, the selector 21 performs the selectivity estimation to obtain a selectivity rate of each of the combined indexes and the performance estimation is processed to estimate the performance of each of the combined indexes based on the selectivity rate. Then, a most effective one of the combined indexes is selected to process the query in actual. At last, a query result is transmitted to the data filter 22 to process further confirmation.

The following are the detailed information of the combined indexes, the selector 21 and the process of data filtering.

The most important technique of the present invention is to select the most effective combined index. Hence, the selector 21 proposed plays a key role. As shown in FIG. 1, the selector 21 comprises a selectivity estimation unit 211, a performance training unit 212, and a combined-index selecting unit 213. The selectivity estimation unit 211 roughly estimates a selectivity rate of each query; the performance training unit 212 builds the relationship between the selectivity rate and performance relating to various indexes; and the combined-index selecting unit 213 combines a result obtained from the selectivity estimation unit 211 and a result obtained from the performance training unit 212 to select a most effective one of the combined indexes.

The selectivity rate of index indicates how much data can be filtered out by an index. Take space-time combined index as an example. There are two orders designed, where spatial index can be positioned before temporal index, vice versa. On using these two sets of combined indexes to process query, final results will be exactly the same, yet intermediate results will be different. Such a behavior can be called "selectivity difference". For example, for a data set of 200 records, if 100 data items are filtered out through a spatial index while a temporal index filters out 50 data items only, the selectivity rates of the spatial index and the temporal index are 50 percent (%) and 25%, respectively. Under this circumstance, indexes with high selectivity rates are processed first for reducing the size of intermediate results and achieving better query performance for indexes in inferior layers.

Selectivity rate depends on query, which means that selectivity rate needs to be estimated for each query. However, an accurate selectivity rate to be selected requires the execution for every one of the combined indexes, which are expensive searches. Hence, the apparatus proposed by the present invention aims to estimate a rough selectivity rate rather than a precise one for achieving better performance. To achieve this goal, the selector 21 constructs all of the combined indexes having larger node sizes through the selectivity estimation unit 211 to achieve better query performance. On receiving a query, the selector 21 is provided with the combined indexes having larger node sizes to process the query for estimating the selectivity rate of each of the combined indexes.

For the performance training unit 21 to calculate the query performance of each of the combined indexes, not only the selectivity rate of each of the combined indexes needs to be estimated, but also the relationship between the selectivity rate and performance of each index needs to be understood. The factor of determining query performance with the performance training unit 212 includes selectivity rate, i.e. index-record input/output (I/O) number, index type, node size, and tree depth. Therein, the effects of node size and tree depth can be combined because the tree depth depends largely on the node size. The bigger is the node size, the fewer is the nodes and the smaller is the tree depth. A smaller tree depth means that index needs to forward less queries for obtaining better performance.

In the present invention, the indexes at different layers have different node sizes and the node size of top-layer index is greater than the node size of bottom-layer index. Because the top-layer index faces a great number of records, query performance can be significantly improved by using a bigger node size. This also means that some unfiltered records will be remained in query result; and is the main reason why the present invention has the process of data filtering for confirming the results obtained from the combined indexes.

On the other hand, different index types have different performances, which leads to that, even when the same size of data are managed, query performances are also different. For example, as compared with $B^+$-tree, the query response time of R-tree may grow rapidly, while Hashmap is not significantly affected by the data size. Besides, selectivity rate can easily affect query performance, as the greater is the record I/O number, more time is required for index to process query. In particular, the present invention also finds that the number of output records has a more serious impact on performance than the number of input records.

Based on these factors, the selector 21 collects relationship between input, output, and performance of each index in different layers of the combined indexes through transmitting a training query by the combined-index selecting unit 213. In particular, the data range of each attribute is recorded during data insertion. These ranges are divided into several equal segments and used as conditions for training query. Through processing bilinear interpolation of training data, the collected training data is used to estimate the query performance of an index with a known selectivity rate (i.e. input and output).

At last, through selectivity estimation and performance training, the performance of each of the combined indexes is estimated, which also means that the performance of any combined indexes can be estimated. Hence, the selector 21 can estimate which combined index may have the best query performance.

As described above, in the combined indexes, records in the leaf node of the superior-layer index are used to construct the inferior-layer indexes. On processing a query in the superior-layer index, the records in the leaf node are not compared with the query. Therefore, the output of the combined indexes surely contains some uncertain records. Hence, after the data filter 22 receives the output of the most effective one of the combined indexes from the selector 21, a process of data filtering is applied to confirm that each independent one of the records satisfies the query.

As shown in the structure in FIG. 1, records are allocated to multiple index structures 2 according to their temporal attributes to achieve load balancing and better scalability. The strategy of dividing records can be based on a predefined time period (i.e. based on time) or a defined record-size threshold (i.e. based on record), which is determined based on data behavior. For indexing the time period managed by different one of the index structures 2, Bk-tree is applied for storing in the master-node device 1. This design also means that, when the apparatus receives a query, the master-node device 1 uses the Bk-tree at first to find the index structures 2 that may have the required records.

For optimizing query performance, the present invention designs a rather complicated index structure. When trying to consider multiple combined indexes and train a selector to choose the most effective combined index, a limitation of index structure is insertion efficiency. Hence, dividing records into different index structures helps keep data size compact. However, under an acceptable insertion time, the cluster size should be as large as possible to benefit the index structure 2 proposed.

As similar to SeaCloudDM, the present invention considers historical data and current data both. The historical data are data that has been already inserted into the index structures 2. The current data are data temporarily stored in a traditional database of the master-node device 1. When the current data is accumulated to match the above-mentioned time-based or record-based threshold, the current data are packed into one of the index structures 2. Once the insertion process is completed, the package of the current data is deleted from the master-node device 1.

As different from managing historical data through the above index structure 2 for better query performance, the current data uses multiple independent indexes (i.e. traditional multiple-attribute indexing method) for indexing. The main reason for this design is that independent index has better performance in data insertion. Although independent index is not the most optimized query system, but for the current data temporarily buffered, a relatively small data size may not cause serious problems during query processing.

The following embodiments are only examples to understand the details and contents of the present invention, but not to limit the scope of patent of the present invention.

The present invention considers four attributes, including spatial attribute, temporal attribute, value attribute, and keyword attribute. For simulation data, three text keywords are simulated, which account for 10%, 40% and 50% of the records respectively. The temporal attribute and value attribute are evenly distributed in two ranges. For the spatial attribute, the records are also evenly distributed. Besides, 100,000 data are used to test the accuracy of the selector 21, and 1,000,000 data are used for comparison with PostGIS.

For real data, air quality data from Taiwan's open IoT data resource platform (Civil IoT Taiwan) are used, where observed phenomenon is the keyword attribute; observed result is the value attribute; temporal phenomenon is the temporal attribute; and position is the spatial attribute. 70 data streams (including approximately 100,000 records) are used for accuracy evaluation, and 300 data streams (including more than 1,000,000 records) are used to test the overall performance and compare with PostGIS.

In the present invention, the selector 21 plays the most important role, which is responsible for selecting a most effective one of the combined indexes. For testing the accuracy of the selector 21, the present invention applies 100,000 records and 1,000 random queries. For the result shown in FIG. 4, all data are simulated, including four evenly distributed attributes. The random queries contain the four attributes. In a state-of-use, the query is "Query all temperature data below 20 degrees Celsius (° C.) for this week in the area of 121 degree (°) to 122° of longitude and 23°~24° of latitude." In the state-of-use, "temperature" is the phenomenon and the search condition for the keyword attribute; "below 20° C." is the value attribute; the condition of longitude and latitude is the spatial attributes; and the limitation of "this week" is a condition of the temporal attribute. For each of the attributes, the present invention randomly selects a condition between a maximum value and a minimum value in the database. Because the return value of the query may be empty, only the response times for non-empty results are considered.

Figure 4:
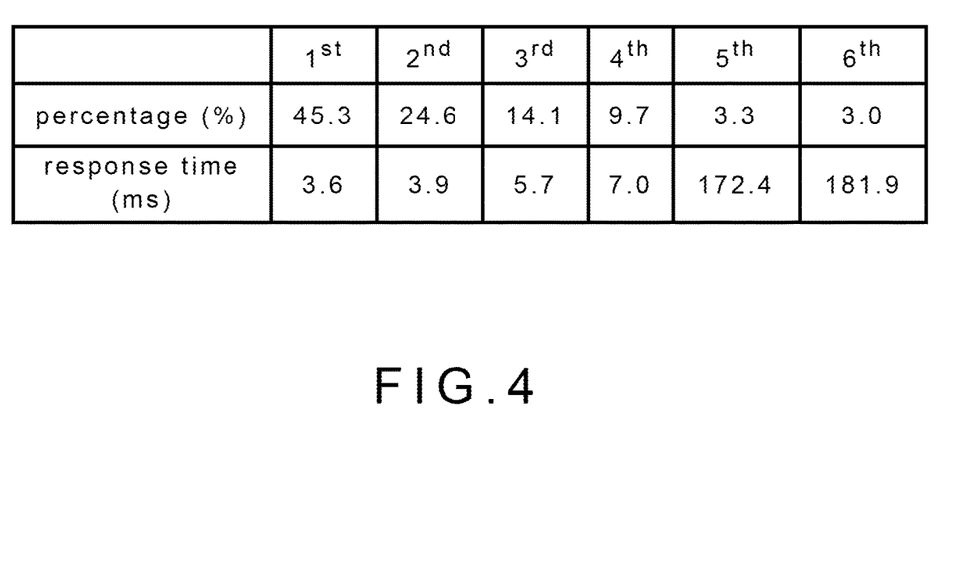
FIG. 4 is the view showing the accuracy of the selector with the simulation data.

In FIG. 4, the values of $1^{st}$ to $6^{th}$ columns represent the percentages of the selected combined indexes. Take the $1^{st}$ column as an example. The $1^{st}$ column shows that, as compared with other combined indexes, the selected combined indexes are actually the fastest indexes. Hence, ideal result is to have all results belong to the 1st column, which means that the selector 21 can thus select the fastest combined indexes for each query. Besides, the query times of the combined indexes are further compared. If the selector 21 selects the 1st column, the average query time is 3.6 milliseconds (ms). As compared with the 6th column, 178.3 ms is saved on average. With the accuracy of the selector 21 using the simulation data as shown in FIG. 4, the 5th and 6th columns are relatively slow as compared with the other columns. Generally speaking, as compared to queries using only one combined index, the present invention has a 93.7% chance of saving 165.4 ms to 178.3 ms.

Figure 5:
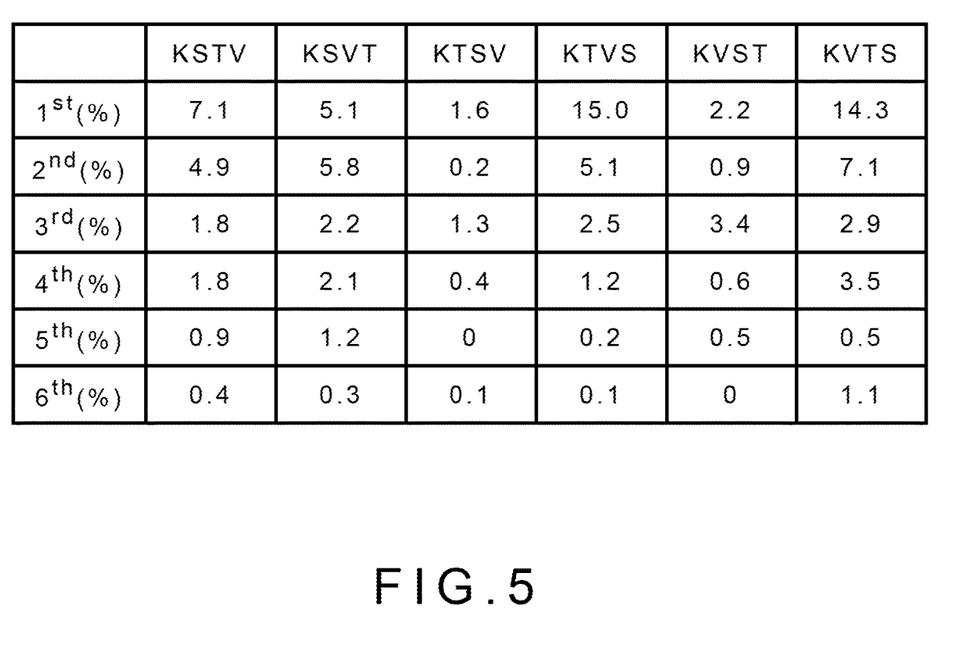
FIG. 5 is the view showing the sharing of the accuracy of the selector with the simulation data.

FIG. 5 shows the sharing of the accuracy of the selector with the simulation data, where the percentage of each simulation result is shown based on the types of the combined indexes. For example, KTVS and KVTS have more chances to become the fastest index, because R-tree usually takes more time than other indexes. But, when the output of an R-tree is very small, its efficiency will be higher, and this is why KSTV and KSVT sometimes perform best. Because front-end index has a more significant impact on performance, KTSV has similar performance as KTVS, and KVST has similar performance as KVTS. Most of the time, KTVS and KVTS perform best, followed by KTSV and KVST.

Figure 6:
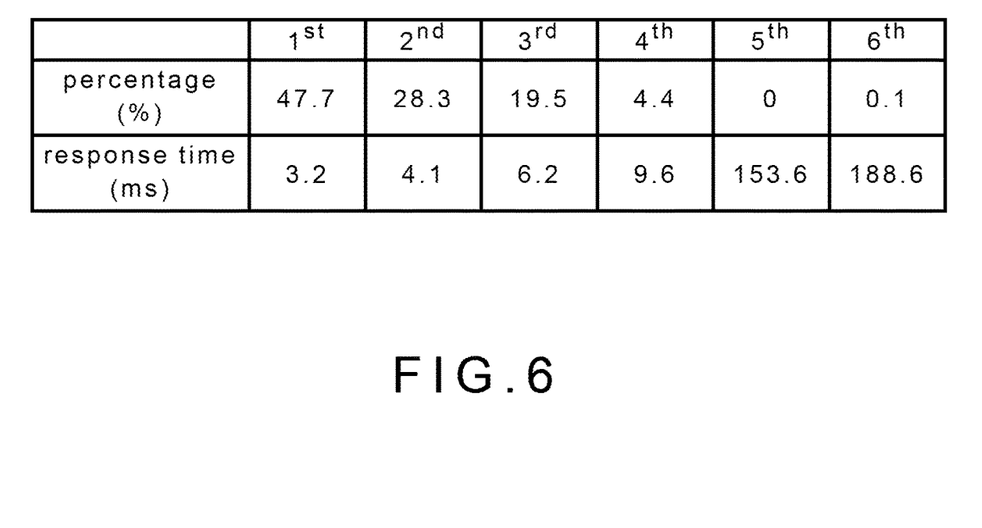
FIG. 6 is the view showing the accuracy of the selector with the actual data.

For testing real data, the accuracy of the selector 21 with the real data are shown in FIG. 6, whose main factor affecting the result is the distribution of data. In the datasets, spatial attribute and value attribute tend to be close to each other. Because the data is collected from on-site air quality stations, a large number of records have the same spatial attribute on managing each observed values. Under this circumstance, once a query of spatial attribute covers a station, the number of the records outputted will suddenly increases.

Figure 7:
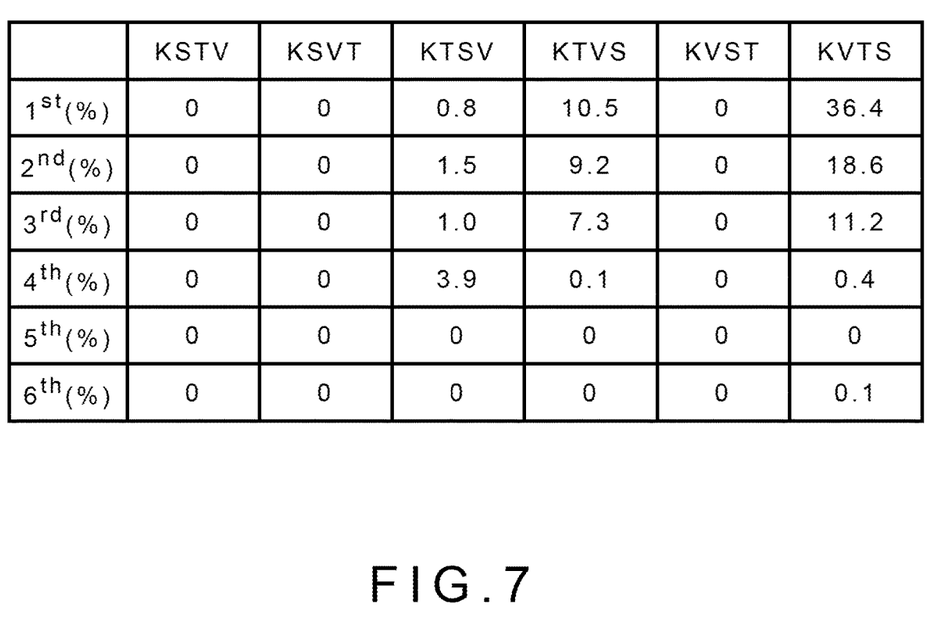
FIG. 7 is the view showing the sharing of the accuracy of the selector with the actual data.
Figure 8:
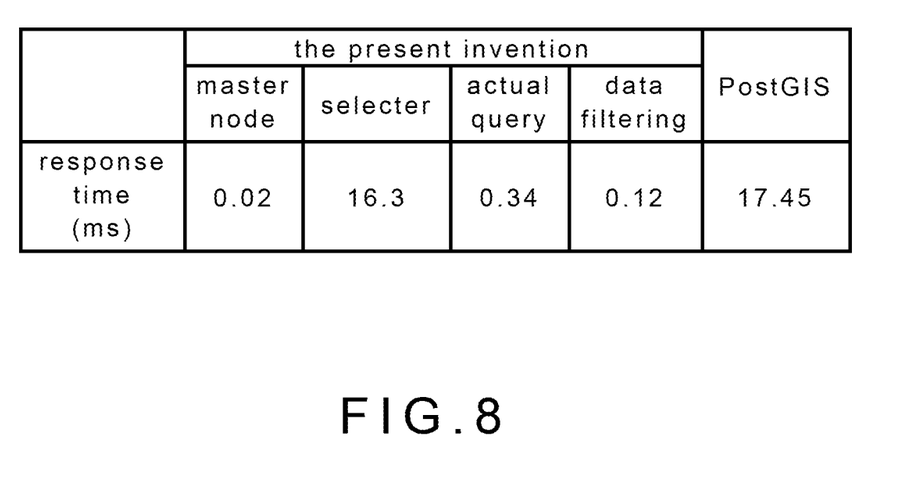
FIG. 8 is the view showing the index performance with the simulation data.
Figure 9:
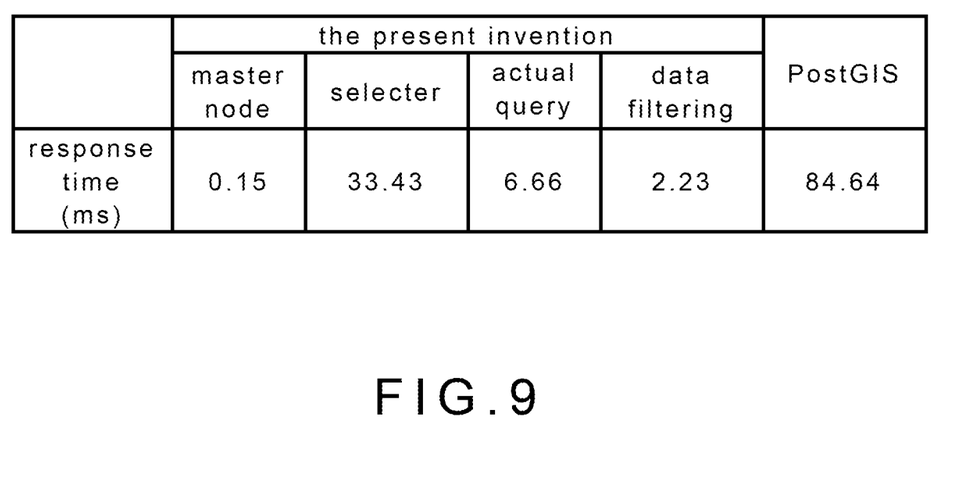
FIG. 9 is the view showing the index performance with the actual data.

FIG. 7 shows the sharing of the accuracy of the selector 21 with real data, where the percentage of each selected result based on the type of the combined indexes is shown. For example, in the datasets, there are about 4000 observed values in one station. The query time of R-tree processing requests for all outputs is even longer than the query time of processing tens of thousands of outputs in Bk-tree. Hence, it is impossible to select KSTV and KSVT as the fastest combined indexes in the datasets. Just like KVST, because the values are close in between, there are more data forwarded from the second layer to the third layer than that forwarded to KTSV, which means that the third-level R-tree needs to process more data. This is the reason why both KTSV and KVST put R-tree on the third layer, while KTSV has a higher chance of better performance. Besides, by grouping data of the same value together, the index size of the value would be very small for further improving efficiency. In summary, R-tree is the main factor in determining which combined index is more effective. Similarly, for the attributes that are close in between, upper indexes have more significant impact on performance. At last, the result of the selector 21 depends on data distribution.

Figure 3:
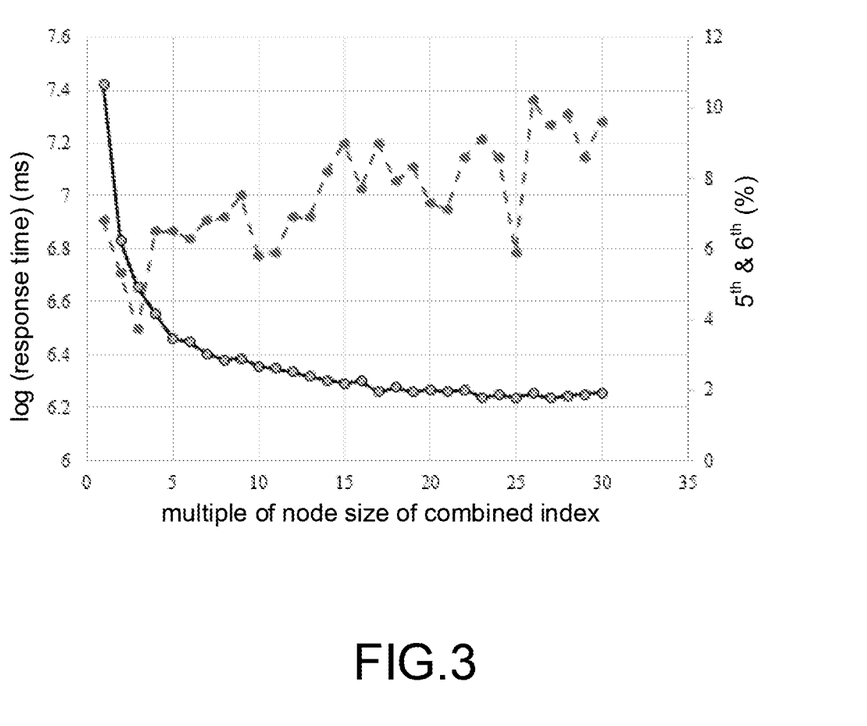
FIG. 3 is the view showing the relationship between the sizes, accuracy, and performance of the nodes selected by the selectors.

As described above, there is a trade-off between the accuracy and performance of the selector 21. The selector 21 is responsible for comparing the six types of the combined indexes and selects the most effective index before processing query in actual. Because the accuracy and performance of the selector 21 are both important, the effectiveness should be as good as possible within an acceptable accuracy range. In the present invention, the use of larger node size allows the selector 21 to have better performance. The larger node size results in better performance for a shallower tree, while some accuracy will be sacrificed inevitably. FIG. 3 shows the relationship between the sizes, accuracy, and performance of the nodes selected by the selector 21. The broken line in the figure shows the results for the 5th and 6th columns on being selected, where these two results usually have poor query performance and show reduced accuracy. The solid line in the figure shows the response times for processing selectivity rate queries. In FIG. 3, when the node size increases, the accuracy gets worse and the performance gets better. However, the performance will not increase indefinitely. Usually, for striking a balance between accuracy and performance, the present invention designs the node size of the selector 21 to be 10 times of the actual size of the combined index.

PostGIS is an extension of PostgreSQL, a widely used spatial database management system. PostGIS supports geographic targets and allows spatial queries. Besides, the ability of establishing a spatial index is also one of the key features of the spatial database management system. By using spatial index, the performance of spatial query is greatly improved. In this assessment, R-tree is used for spatial index. The compared database also builds indexes for other attributes (including temporal attribute, keyword attribute, and value attribute).

The traditional relational database PostGIS is compared with the index structures 2 proposed in the present invention. In the performance comparison (simulation data) between FIG. 8 and PostGIS and the performance comparison (real data) between FIG. 9 and PostGIS, the query of the index structures 2 proposed in the present invention is divided into several steps, including steps for master node, selector, actual query and data filtering. At first, it is found that, on dealing with unevenly distributed data, the performances of the present invention and PostGIS are both poor. Besides, through adaptively selecting a best combined index, obvious advantage is shown in the case of uneven data distribution. Most of the query time is spent by the selector 21, because all possible orders of the combined indexes need to be scanned for selecting the best index. Even so, the present invention also strikes a balance between accurately determining the combined index by the selector 21 and improving query efficiency.

As is described above, the present invention uses four common data attributes, including temporal attribute, spatial attribute, keyword attribute (physical quantity description), and value attribute. Since different attributes are suitable for different indexing methods, on integrating all of their different index structures, it is found that the orders of indexes integrated have significant impact on query performance. The present invention is a structure with multiple indexes, where all possible combined-index orders are considered and the best combined index is selected according to different query adaptabilities. As result shows, with one million items of data, the structure proposed in the present invention, as compared to a structure with indexes of a single sequence, has a 99% to 94% chance of saving query time at a rate of 25 to 51 times. Furthermore, as compared to the traditional relational database PostGIS, the reaction time is also twice faster.

Hence, the present invention constructs index structures integrating various orders of indexes to obtain a plurality of combined indexes. After acquiring the performance for a query through training, the present invention adaptively selects the most efficient combined index based on the query to further improve the performance of data query.

Overall, the present invention is characterized in the following:

1. Various combined indexes are supported and a most efficient combined index is selected based on individual indexes.

2. As compared to a structure with indexes of a single sequence, the index structure proposed in the present invention has a 99% to 94% chance of saving query time at a rate of 25 to 51 times. Furthermore, as compared to the traditional relational database PostGIS, the reaction time is also twice faster.

To sum up, the present invention is an apparatus of adaptive index structures with multiple attributes, where a structure adaptively selects the most efficient combined index through estimating index performance and filtering rate individually; the main concept is to set indexes with high filtering rates at positions having higher priorities for processing queries; and, thus, the intermediate result of query is minimized and the performance of data query is further improved.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus of adaptive index structures with multiple attributes, comprising:
   one or more processors; and
   a memory comprising processor executable instructions that, when executed by the one or more processors, cause the apparatus to:
   balance a plurality of loads of different index structures after accumulating a certain amount of data using a master-node device, said master-node device obtaining a B+-tree to index a plurality of time periods being managed by each of said index structures, said master-node device having leaf nodes connecting to said index structures; and, said index structures integrating various orders of indexes to obtain a plurality of combined indexes, each of said index structures comprising a selector and a data filter, said selector selecting a most suitable one of said combined indexes according to a query condition,
   wherein each of said combined indexes has four data attributes, including keyword attribute, value attribute, temporal attribute, and spatial attribute; said data attributes has different orders thereof to obtain said combined indexes; and each of said combined indexes has a single tree structure integrating said indexes of different layers; and wherein said leaf node of a superior-layer index is the root node of inferior-layer indexes; said indexes at different layers have different node sizes; and said node size of top-layer index is greater than said node size of bottom-layer index,
   wherein, on receiving a query from a user, said temporal attribute is applied at first to select a corresponding one of said index structures and said query is transmitted to each of said index structures; said selector of each of said index structures selects a most effective one of said combined indexes to process said query; after finishing said query, a candidate result is obtained to be transmitted to said data filter to filter out unwanted data; and, at last, an item of original data is searched out from a key-value storage to be responded back to said user, and
   wherein each of said combined indexes comprises an R-tree applied to said spatial attribute, two B+-tree applied to said temporal attribute and said value attribute, and a Hashmap applied to said keyword attribute; and a first-layer index is obtained with said Hash map.

2. The apparatus according to claim 1, wherein said query in each of said index structures is processed through four steps, including selectivity estimation, performance estimation, index query, and data filtering; and, on receiving said query, said selector performs said selectivity estimation to obtain a selectivity rate of each of said combined indexes; after processing said performance estimation to estimate performance of each of said combined indexes based on said selectivity rate, a most effective one of said combined indexes is selected to process said query in actual; and, at last, a query result is transmitted to said data filter to process further confirmation.

3. The apparatus according to claim 1, wherein said selector comprises a selectivity estimation unit, a performance training unit, and a combined-index selecting unit; and wherein said selectivity estimation unit roughly estimates a selectivity rate of each query; said performance between said training unit obtains selectivity rate and relationship performance relating to each of various indexes; and said combined-index selecting unit combines a result obtained from said selectivity estimation unit and a result obtained from said performance training unit to select a most effective one of said combined indexes.

4. The apparatus according to claim 3, wherein said selectivity estimation unit obtains said combined indexes having larger node sizes; and, on receiving said query, said selector obtains said combined indexes having larger node sizes to process said query to estimate said selectivity rate of each of said combined indexes.

5. The apparatus according to claim 3, wherein said performance training unit obtains a query performance of each of said combined indexes and obtains factors of said query performance relating to said selectivity rate, comprising index-record input/output (I/O) number, index type, node size, and tree depth.

6. The apparatus according to claim 3, wherein said combined-index selecting unit has said selector obtain relationship between input, output, and performance of each index in different layers of said combined indexes through transmitting a training query.

7. The apparatus according to claim 1, wherein said combined index obtains records in said leaf node of said superior-layer index to obtain said inferior-layer indexes; and wherein, on processing said query in said superior-layer index, said records in said leaf node are not processed with said query; and, after said data filter receives the output of said most effective one of said combined indexes from said selector, a process of data filtering is applied to confirm each independent one of said records satisfying said query.

* * * * *